United States Patent Office

2,948,599
Patented Aug. 9, 1960

2,948,599

GASOLINE FUEL COMPOSITIONS

Harold D. Orloff, Detroit, and Francis X. Markley, Ferndale, Mich., assignors to Ethyl Corporation, New York, N.Y., a corporation of Delaware No Drawing. Filed July 26, 1954, Ser. No. 445,898

9 Claims. (Cl. 44—69)

This invention relates to dimethyl-(monophenyl)-phosphates.

Organic compounds of phosphorus have been suggested as gasoline additives to reduce autoignition, spark plug fouling, and associated problems. However, for one or more reasons phosphorus compounds known and so used heretofore have not been entirely satisfactory. Typical limitations hindering otherwise acceptable additives include instability, low hydrocarbon solubility, high water solubility, corrosiveness, insufficient engine inductibility, and characteristics promoting reduction in antiknock effectiveness and loss of exhaust valve life.

An object of this invention is to provide new and useful phosphates. Another object is to provide phosphorus compounds which by virtue of their properties are well suited for use as addition agents to hydrocarbons of the gasoline boiling range and for other purposes. A further object is to provide both improved fuel compositions for spark ignition internal combustion engines and composite additives for gasoline.

It has now been found that the above and other objects of this invention are provided by dimethyl-(monophenyl)-phosphates having the formula

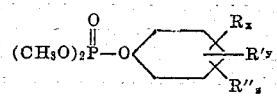

wherein R, R', and R" are the same or different lower alkyl radicals, that is, alkyl radicals containing up to six carbon atoms, and $x$, $y$, and $z$ can be the same or different integers and are from 0 to 1, the total number of carbon atoms of R, R', and R" being not greater than six.

The properties of our novel phosphates make them particularly useful as gasoline additives. Thus, we provide improved fuels for spark ignition engines comprising a hydrocarbon of the gasoline boiling range and a dimethyl-(monophenyl)-phosphate as described above. Such fuels preferably contain an organolead antiknock agent. Also provided by the characteristics of our compounds are improved composite additives for fuel for spark ignition engines comprising an organolead antiknock agent and one or more of our novel phosphates.

The esters of this invention can be prepared by reacting dimethyl phosphoryl chloride with the appropriate sodium phenoxide formed in aqueous solution. The reaction is carried out by contacting approximately equimolar proportions of these reagents while maintaining the temperature at about 25° C. A moderate excess of the particular sodium phenoxide may be used, the excess being about 0.5 of a mole over theoretical.

The above process is carried out with agitation, and since the reaction is somewhat exothermic, temperature control is maintained by regulation of the rate of addition of the reactants as well as by conducting the reaction in such a manner that heat can be removed therefrom.

Upon completion of the reaction, the reaction mixture is extracted with a suitable organic solvent such as carbon tetrachloride, followed by water washing. The resulting product is then dried and distilled at reduced pressure.

Dimethyl phosphoryl chloride used as a starting material is conveniently prepared by reacting dimethyl hydrogen phosphite with chlorine gas, the reactants being in approximately equimolar proportions. The temperature of this reaction is kept below about 20° C. by controlling the rate of addition of the chlorine gas. Hydrogen chloride gas liberated in this reaction is removed by any convenient means, such as aspiration or air blowing.

The following examples, wherein all parts and percentages are by weight, illustrate the preparation of the novel esters of this invention.

EXAMPLE I 110 parts of dimethyl hydrogen phosphite was reacted with incremental portions of chlorine gas while maintaining the temperature below 15° C. Hydrogen chloride formed was stripped off while stirring the reaction mixture maintained at a pressure of 20 millimeters of mercury. The product of this reaction was added to 152 parts of m-cresol dissolved in approximately 160 parts of a 40 percent aqueous sodium hydroxide solution. This addition occurred over a period of 30 minutes while maintaining the temperature at 25° C. 200 parts of water was then added to the reaction mixture which was then extracted with carbon tetrachloride. The crude product was washed, dried, and purified by distillation at one millimeter of mercury pressure. 113 parts of purified dimethyl m-tolyl phosphate having a boiling range of 113–115° C. at one millimeter of mercury pressure was formed. Analysis revealed 14.5 percent of phosphorus corresponding to the formula $C_9H_{13}O_4P$.

EXAMPLE II

Using the procedure of Example I 126 parts of sodium phenolate is reacted with 145 parts of dimethyl phosphoryl chloride. Dimethyl phenyl phosphate is formed.

EXAMPLE III 144 parts of the sodium salt of 2,3-dimethyl phenol (vicinal-o-xylenol) is reacted with 145 parts of dimethyl phosphoryl chloride at a temperature of 20° C. The resulting product is dimethyl (2,3-dimethylphenyl)-phosphate.

EXAMPLE IV

Dimethyl-p-ethylphenyl phosphate is prepared by reacting 73 parts of dimethyl phosphoryl chloride with 85 parts of the sodium salt of p-ethylphenol at a temperature of 25° C.

EXAMPLE V 73 parts of dimethyl phosphoryl chloride is added portionwise to 86 parts of the sodium salt of m-sec-butyl phenol. The temperature is held at 25° C. Dimethyl m-sec-butyl phenyl phosphate is formed.

EXAMPLE VI

Dimethyl-(3,5-diethylphenyl)-phosphate is prepared by reacting at 30° C. 82.5 parts of dimethyl phosphoryl chloride and 172 parts of the sodium salt of 3,5-diethyl phenol.

EXAMPLE VII 110 parts of dimethyl phosphoryl chloride is added portionwise to a 30 percent aqueous solution of the sodium salt of 2,4,5-trimethyl phenol. The mixture is stirred while holding the temperature at 25° C. Dimethyl-(2,4,5-trimethylphenyl)-phosphate is formed.

EXAMPLE VIII 100 parts of the sodium salt of 2,4-di-n-propyl phenol is reacted at 25° C. with dimethyl phosphoryl chloride. The product is dimethyl 2,4-di-n-propyl phenyl phosphate.

EXAMPLE IX

Dimethyl-p-n-hexyl phenyl phosphate is prepared by reacting 110 parts of dimethyl phosphoryl chloride with 250 parts of the sodium salt of p-n-hexyl phenol.

EXAMPLE X

The procedure of Example I is repeated with the exception that 200 parts of the sodium salt of 2-methyl-4-isopropyl-5-ethyl phenol is used as a starting material. The resulting product is dimethyl-(2-methyl-4-isopropyl-5-ethylphenyl)-phosphate.

By suitable choice of starting materials the various compounds of this invention can be obtained in high yield and purity. Thus, we can prepare dimethyl monophenyl phosphates where the phenyl group is substituted with up to six carbon atoms as up to three lower alkyl radicals from such phenols as ortho-, meta-, or para-cresol; xylenols such as 2,3-dimethyl phenol, 3,4-dimethyl phenol, 3,5-dimethyl phenol, 2,6-dimethyl phenol, 2,4-dimethyl phenol, and 2,5-dimethyl phenol; mono-ethyl, -propyl, -isopropyl, -butyl, -amyl, or -hexyl phenols where such straight or branched chain alkyl groups are in the ortho, meta or para position. Similarly di- and trialkyl substituted phenols such as 2,4-dimethyl-5-t-butyl phenol, 2,4-dimethyl-6-ethyl phenol, 2-methyl-4,5-diethyl phenol and the like can be used in preparing our novel phosphates. Mixtures of appropriate phenols may also be used in preparing our compounds, a mixture obtained by coal-hydrogenation and containing predominantly xylenols, cresols and ethyl phenols serving as an example.

The novel esters of this invention are colorless liquids which are highly soluble in most organic solvents. For example, our esters are soluble in all proportions at 25° C. in various gasoline stocks such as straight run fuels; cracked fuels, resulting from thermal and catalytic processes; and other fuel types such as obtained by reforming, catalytic reforming or alkylation.

The phosphates of this invention when present in leaded gasoline in which the lead content is as much as 6.3 grams per gallon reduce deposit-induced autoignition, also known as wild ping. In this capacity, our esters act as ignition control compounds by suppressing the erratic uncontrolled ignition occurring at a period in the combustion cycle different from that produced by the spark. The use of such fuels also results in the alleviation of spark plug fouling.

As an additive to leaded hydrocarbons of the gasoline boiling range, we employ our compounds in amount from about 0.05 to 0.5 theory of phosphorus, a theory of phosphorus being defined as the amount of phosphorus theoretically required to react with the lead to form lead ortho phosphate, namely, two atoms of phosphorus per every three atoms of lead. Thus, one theory of phosphorus equals a phosphorus-to-lead atom ratio of 2:3. Therefore, the foregoing range of from about 0.05 to 0.5 theory of phosphorus corresponds to phosphorus-to-lead atom ratios of from about 0.1:3 to 1:3. This amount is sufficient to reduce deposit-induced autoignition.

The following examples wherein parts are by weight illustrate the manner in which improved fuel compositions of the present invention are prepared.

EXAMPLE XI

To 3,000 parts of a blend of straight run, catalytically cracked and polymer blending stocks containing 4.95 parts of tetraethyllead as a conventional antiknock mixture comprising tetraethyllead, 0.5 theory of bromine as ethylene dibromide, and 1.0 theory of chlorine as ethylene dichloride is added 0.43 part of dimethyl m-tolyl phosphate. Upon mechanically agitating this mixture momentarily, a homogeneous improved fuel composition of this invention containing about 0.2 theory of phosphorus as dimethyl m-tolyl phosphate is obtained.

EXAMPLE XII

To 3,000 parts of a high octane quality aviation fuel base stock containing 7.59 parts of tetraethyllead as an antiknock fluid comprising tetraethyllead and 1.0 theory of bromine as ethylene dibromide is added 1.08 parts of dimethyl p-ethylphenyl phosphate. Agitation of this mixture produces a homogeneous improved fuel composition of this invention containing about 0.3 theory of phosphorus as dimethyl p-ethylphenyl phosphate.

Example XI is illustrative of the manner in which a typical automotive fuel of this invention is compounded. The preparation of a typical aviation fuel of our invention is described in Example XII. Such fuels reduce wild ping rate by as much as 80 percent of that produced by the same fuels in the absence of our compound.

Besides having inherent effectiveness as an ignition control compound the novel esters of this invention have a number of characteristics further enhancing their utility in this regard. They exhibit substantially no adverse effect on tetraethyllead antiknock effectiveness. They are readily blended with gasoline hydrocarbons, are compatible on storage in gasolines containing lead alkyl antiknock agents, and are highly inductible in multi-cylinder engines. Moreover, our esters are only sparingly soluble in water and resist hydrolysis.

An outstanding characteristic of our esters is that they exhibit substantially no adverse effect on tetraethyllead antiknock effectiveness. To illustrate, individual portions of a representative gasoline containing 3.0 milliliters of tetraethyllead per gallon as an antiknock fluid comprising tetraethyllead, 0.5 theory of bromine as ethylene dibromide, and 1.0 theory of chlorine as ethylene dichloride—each portion containing a given concentration of phosphorus as dimethyl m-tolyl phosphate—were subjected to the standard ASTM Research Method, Test Procedure D-908 (which can be found in the 1952 edition of "ASTM Manual of Engine Test Methods for Rating Fuels"). As comparisons, individual portions of the same fuel containing the same amount of the antiknock fluid above described and identical concentrations of phosphorus as various additives suggested heretofore were subjected to the same test procedure. The results of these tests are shown in Table I.

*Table I*

PERCENT TETRAETHYLLEAD EFFECTIVENESS DESTROYED

| Additive | Concentration of Phosphorus | |
| --- | --- | --- |
|  | 0.2T | 0.5T |
| dimethyl m-tolyl phosphate | 0 | 0 |
| trimethyl phosphate | 2 | 5 |
| tricresyl phosphate | 2.5 | 3 |
| tri-n-butyl phosphite | 1 | 5 |

The phosphates of this invention being hydrocarbon soluble liquids can be blended directly into the refinery stream by means of liquid proportioning pumps or the like, or gasoline concentrates such as 10 percent solutions can be readily prepared and similarly used.

When stored at a temperature of 110° F. for long periods of time leaded gasoline containing 0.2T of phosphorus as the phosphates of this invention show virtually no signs of decomposition or sludge formation.

Our compounds are highly inductible in multi-cylinder engines. During manifolding where more or less evaporation of the fuel occurs our esters are soluble in the heavy ends to such an extent that they remain in solution even after most of the more volatile fuel components have vaporized. Thus, our compounds present no induction system deposit problems.

The novel esters of this invention are practically insoluble in water, having a solubility at 25° C. of less than 1 percent. This further enables our compounds to be used as fuel additives since they remain dissolved in the fuel even when stored over water. Furthermore, our compounds are hydrolytically stable and are thus not subject to deterioration resulting from the presence of water which is invariably present in commercial gasoline.

Another embodiment of this invention relates to improved antiknock fluids, i.e. composite additives. Commercial practice involves the provision of antiknock fluids which comprise organolead antiknock agents, notably tetraethyllead, one or more halogen scavengers and a blending agent such as kerosene. Such fluids also contain organic dyes and may contain antioxidants, rust inhibitors, anti-icing agents, and the like. Thus, to further facilitate blending procedures, we provide antiknock fluids containing from about 0.05 to about 0.5 theory of phosphorus as one or more of the novel phosphate esters of this invention.

The composition of typical antiknock fluids of this invention is shown in Table II wherein the figures given are percent by weight.

Table II

| Component | Aviation Fluids | Automotive Fluids |
|---|---|---|
| tetraethyllead | 54.02 to 60.58 | 54.07 to 60.65. |
| ethylene dibromide | 31.38 to 35.19 | 15.71 to 17.62. |
| ethylene dichloride | | 16.54 to 18.56. |
| dye, kerosene, impurities | 2.57 to 2.88 | 1.63 to 1.83. |
| dimethyl m-tolyl phosphate | 1.35 to 12.03 | 1.35 to 12.05. |

When blended with non-leaded hydrocarbons of the gasoline boiling range our esters beneficially modify the nature and properties of deposits which have previously accumulated in the engine. Consequently, the presence of one or more of the novel phosphate esters of this invention in amount up to about 65 pounds per 1,000 barrels of gasoline results in the alleviation of deposit-induced autoignition and spark plug fouling.

In the fuel and antiknock fluid embodiments of this invention we can use our esters with various organic halide scavengers such as trichlorobenzene, dibromotoluenes, and, in general, those disclosed in U.S. Patents 1,592,954; 1,668,022; 2,364,921; 2,479,900; 2,479,901; 2,479,902; 2,479,903, and 2,496,983. When we use mixtures of chloro- and bromohydrocarbons as scavengers we prefer concentrations and proportions as described in U.S. Patent 2,398,281.

The organolead antiknock agents used in the antiknock fuel and fluid embodiments of our invention are hydrocarbon lead compounds, that is, lead alkyls such as tetramethyllead, tetraethyllead, tetrapropyllead, dimethyl diethyllead, trimethylethyllead, and lead aryls such as tetraphenyllead. Halogen-containing compounds such as triethyllead bromide may also be used.

The novel esters of this invention are useful as additives to lubricating oils particularly those having a viscosity from about 30 seconds at 100° F. to about 250 seconds at 210° F. When so employed our compounds serve to reduce oxidation of the oil and its tendency to thicken at low temperatures while reducing bearing corrosion and improving lubricating characteristics, particularly of those oils designed for extreme pressure service such as hypoid gear lubricants. Concentrations of our esters up to about 5 percent by weight or higher can be used. However, ordinarily it is sufficient if the concentration is less than about one percent by weight.

Our esters are also useful as fireproofing agents, particularly of normally inflammable textile materials. Not only do the phosphates of this invention render such materials as yarns and plastic compositions (e.g. cellulose acetate) fireproof without affecting their softness and draping qualities, but because our esters do not possess the property of irritating human skin such utility is enhanced. Our esters are also useful as plasticizers particularly for vinyl resins. For example, our esters are capable of lowering the brittle point and stiffness of polyvinyl chloride when employed therein in relatively small concentrations.

As many widely differing variations of the present invention are possible without departing from the spirit and scope thereof, it is not intended that this invention be limited except as defined by the appended claims.

We claim:

1. A fuel composition adapted for use in spark ignition internal combustion engines which consists essentially of hydrocarbons of the gasoline boiling range containing an antiknock quantity of an organolead antiknock agent and, in quantity sufficient to reduce deposit-induced autoignition, a dimethyl monophenyl phosphate having the formula

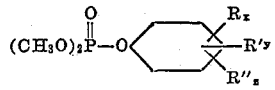

wherein R, R', and R'' are methyl radicals and $x$, $y$ and $z$ are integers and are from 0 to 1.

2. A fuel composition adapted for use in spark ignition internal combustion engines which consists essentially of hydrocarbons of the gasoline boiling range containing an antiknock quantity of an alkyllead antiknock agent, a scavenging amount of organic halide scavenger capable of reacting with the lead during combustion in a spark ignition internal combustion engine to form relatively volatile lead halide, and, in quantity sufficient to reduce deposit-induced autoignition, a dimethyl monophenyl phosphate having the formula

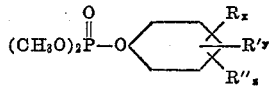

wherein R, R', and R'' are methyl radicals and $x$, $y$ and $z$ are integers and are from 0 to 1.

3. A fuel composition adapted for use in spark ignition internal combustion engines which consists essentially of gasoline containing an antiknock quantity of tetraethyllead, about 0.5 theory of bromine as ethylene dibromide, about 1.0 theory of chlorine as ethylene dichloride, and, in quantity sufficient to reduce deposit-induced autoignition, dimethyl tolyl phosphate.

4. A fuel composition adapted for use in spark ignition internal combustion engines which consists essentially of gasoline containing an antiknock quantity of tetraethyllead, about 0.5 theory of bromine as ethylene dibromide, about 1.0 theory of chlorine as ethylene dichloride, and, in quantity sufficient to reduce deposit-induced autoignition, dimethyl xylyl phosphate.

5. An addition agent for hydrocarbons of the gasoline boiling range consisting essentially of an organolead antiknock agent, and, in quantity sufficient to reduce deposit-induced autoignition, a dimethyl monophenyl phosphate having the formula

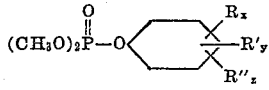

wherein R, R', and R'' are methyl radicals and $x$, $y$ and $z$ are integers and are from 0 to 1, said quantity being such that the phosphorus-to-lead atom ratio is from about 0.1:3 to about 1:3.

6. An addition agent for hydrocarbons of the gasoline boiling range consisting essentially of an alkyllead antiknock agent, a scavenging amount of organic halide scavenger capable of reacting with the lead during combustion in a spark ignition internal combustion engine to from relatively volatile lead halide, and, in quantity sufficient to reduce deposit-induced autoignition, a dimethyl monophenyl phosphate having the formula

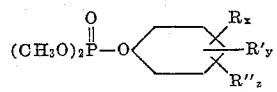

wherein R, R', and R" are methyl radicals and $x$, $y$ and $z$ are integers and are from 0 to 1, said quantity being such that the phosphorus-to-lead atom ratio is from about 0.1:3 to about 1:3.

7. An addition agent for hydrocarbons of the gasoline boiling range consisting essentially of tetraethyllead, about 0.5 theory of bromine as ethylene dibromide, about 1.0 theory of chlorine as ethylene dichloride and dimethyl tolyl phosphate present in amount such that the phosphorus-to-lead atom ratio is about 0.4:3.

8. An addition agent for hydrocarbons of the gasoline boiling range consisting essentially of tetraethyllead, about 0.5 theory of bromine as ethylene dibromide, about 1.0 theory of chlorine as ethylene dichloride and dimethyl xylyl phosphate present in amount such that the phosphorus-to-lead atom ratio is about 0.4:3.

9. An addition agent for hydrocarbons of the gasoline boiling range consisting essentially of an alkyllead antiknock agent and dimethyl monophenyl phosphate in an amount such that the phosphorus-to-lead atom ratio is from about 0.1:3 to about 1:3.

References Cited in the file of this patent
UNITED STATES PATENTS

| | | |
|---|---|---|
| 2,250,662 | Walter | July 29, 1941 |
| 2,405,560 | Campbell | Aug. 13, 1946 |
| 2,427,173 | Withrow | Sept. 9, 1947 |
| 2,678,329 | Gamrath et al. | May 11, 1954 |
| 2,759,962 | Zenftman et al. | Aug. 21, 1956 |
| 2,765,220 | Yust et al. | Oct. 2, 1956 |
| 2,892,691 | Howell | June 30, 1959 |

FOREIGN PATENTS

| | | |
|---|---|---|
| 683,405 | Great Britain | Nov. 26, 1952 |

OTHER REFERENCES

"Suitability of Gasolines as Fuel," by James et al., Ind. and Eng. Chem., March 1948, vol. 40, No. 3, pages 405–411.

Ind. Eng. Jour., March 1951, vol. 43, No. 3, "Antiknock Antagonists," by Livingston, pages 663–670.